(12) United States Patent
Dall'Omo et al.

(10) Patent No.: US 7,547,184 B2
(45) Date of Patent: Jun. 16, 2009

(54) THREE LAYER STACKING STATION FOR FORMING A PILE OF ITEMS FROM THE THREE LAYERS

(75) Inventors: Davide Dall'Omo, Bologna (IT); Christian Zabnoni, Bologna (IT)

(73) Assignee: Tissue Machinery Company S.p.A., Bologna (IT)

(*) Notice: Subject to any disclaimer, the term of this patent is extended or adjusted under 35 U.S.C. 154(b) by 132 days.

(21) Appl. No.: 11/453,629

(22) Filed: Jun. 15, 2006

(65) Prior Publication Data

US 2007/0098541 A1 May 3, 2007

(51) Int. Cl.
*B65B 35/50* (2006.01)
*B65B 35/44* (2006.01)

(52) U.S. Cl. .............. 414/791; 414/791.1; 414/794.7; 198/435; 198/418.4; 198/369.2

(58) Field of Classification Search .............. 414/791.4, 414/792.6, 792.8, 789.6, 794.7, 790.9, 788.4; 198/418.2–418.4, 435, 448, 449, 369.2; 271/9.01; 53/152

See application file for complete search history.

(56) References Cited

U.S. PATENT DOCUMENTS 5,605,433 A * 2/1997 Tanaka ................... 414/793.4
6,227,377 B1 * 5/2001 Bonnet .................... 209/650
6,659,710 B2 * 12/2003 Gamberini ............... 198/418.4
6,851,919 B2 * 2/2005 Cinotti et al. ............ 414/794.5

* cited by examiner

Primary Examiner—Gregory W Adams
(74) Attorney, Agent, or Firm—William J. Sapone; Coleman Sudol Sapone P.C.

(57) ABSTRACT

In a station for forming a pile of layers of items, a surface receives layers of items to be transferred to a first support plane situated after the receiving surface. The items arranged in layers are moved along the receiving surfaces and the first support plane by driving chains connected by rods set crosswise to the receiving surface and support plane. The support plane is spaced apart from the receiving surface to define a window and a descending ramp is situated below the window. An additional conveyor formed by narrow slats or rolls, is situated at the window and is operated so that one flexible plate moves to cover and uncover the window, so that layers of items are alternately either carried from the receiving surface to the support plane or made to pass through the window and released on the descending ramp. The ramp can change inclination so as to connect the receiving surface to either one or the other of second and third support planes situated below the first support plane.

9 Claims, 3 Drawing Sheets

THREE LAYER STACKING STATION FOR FORMING A PILE OF ITEMS FROM THE THREE LAYERS

FIELD OF THE INVENTION

The present invention relates to an automatic machine for packaging items into wrappings of heat-weldable material.

DESCRIPTION OF THE PRIOR ART

Machines for packaging rolls of paper into wrappings of heat-weldable material are known to those skilled in this field, which machines include grouping, forming and packaging stations.

In the grouping station, the paper rolls are grouped in layers, each layer including rolls arranged orderly.

In the forming station, a pile is defined by placing more layers one above another, while in the packaging station the pile is wrapped with a sheet of heat-weldable material, so as to obtain the desired wrapping.

In particular, the present invention relates to a station for forming a pile of items, preferably cylindrical, for example made of rolls of paper.

The documents U.S. Pat. No. 3,455,085 and IT 1.225.033 describe stations for forming piles of layers of cylindrical items, which station include each one:

- a surface for supporting layers of cylindrical items coming from the grouping station, which is situated upstream, and with the end portion of the surface, turned toward the packaging station, made to swing up and down, thus constituting a kind of pendulum, through a number of positions, which is equal to the number of layers to obtain;
- a series of receiving surfaces, which are situated one over another and whose number is equal to the number of layers to be formed; each of the receiving surfaces is located at the same level of a relevant mentioned positions and adjacent to the moving end of the pendulum;
- first means for moving the pendulum and capable of defining one of the relevant positions;
- second means, operated in step relation with the first means, to move the above mentioned layers along the support surface;
- third means, which are connected to each receiving surface, and which have pushing means, operated synchronously and aligned vertically above the receiving surfaces.

During operation of the forming stations, the layers are moved with the same speed, and therefore there is no reciprocal shifting between the layers, when the pile is being formed on the lower surface.

The pendulum has, fastened thereto, said first means, which are therefor driven into oscillation, by suitable motor means, which impose the oscillation with respect to the articulation with the associated support surface.

It is to be pointed out that the inertia of the pendulum, and of the devices associated thereto, influences considerably the time necessary for the pendulum to pass from one position to another; moreover, during the oscillation, the pendulum carries rolls, which detach therefrom when a prefixed speed is overcome in the downwards motion; this is a serious limitation for the production rate of the formation station.

The document U.S. Pat. No. 6,659,710 describes a station for forming a pile of items, which station includes:

- a pair of upper coplanar support surfaces, namely a first upper surface spaced apart from a second supper surface to define a window therebetween wide enough for the layers to pass therethrough;
- first means for conveying the layers on the upper support surfaces;
- a stationary descending slope-ramp, situated between and below the first and second upper support surfaces and leading to a lower support surface, situated below the second upper support surface;
- an auxiliary conveyor featuring gaps and having an upper branch situated at the level of the window, for alternately transferring one layer between the upper support surfaces, in cooperation with the first conveying means, and leaving one subsequent layer to pass through the window, and descending the fixed descending ramp;
- second means for moving each layer onto the fixed descending ramp and for conveying the layer to the lower support surface;
- third means for moving each layer on the lower working surface below and with the same speed with respect to the related layer placed upon the upper support surface.

With such a configuration it is possible to avoid the disadvantages connected to inertia of the pendulum and the devices connected thereto, obtaining piles of two layers of items, with a good production rate of the forming cycle.

SUMMARY OF THE INVENTION

The object of the present invention is to avoid the above disadvantages by proposing a station, which is capable of forming a pile of a plurality of items arranged in layers, in particular more than two layers, characterized by best functionality and versatility standards.

Another object of the present invention is to propose a station including devices not affected by the effects of the inertia and very reliable, so as to allow high production rate.

The above mentioned objects are obtained, in accordance with the contents of claims, by a station for forming a pile of items arranged in layers, the station including:

- a receiving surface for receiving items arranged in layers and coming from a feeding station situated upstream;
- a first support plane, situated after said receiving surface, from which it is spaced apart, so as to delimit a gap or window with dimension such that said items arranged in layers can pass freely through said window;
- first driving means for conveying the items in layers along the receiving surface and the first support plane in a feeding direction;
- a second support plane, situated at a level lower than said first support plane;
- at least a third second support plane, situated at a level lower than said first and second support planes;
- a descending ramp situated below said window and extending downstream, moved by relevant operation means to swing and join said receiving surface with either the second support plane or the third support plane;
- an additional conveyor in a position corresponding to and below said window for selectively either conveying said items in layers from the receiving surface to the first support surface, due to the action of said first driving means, or for allowing said items in layers, coming from the receiving surface to pass through the window and access to the descending ramp;
- second driving means situated along said descending ramp and operated in step relation with said additional conveyor for pushing said items in layers passed through said window and sliding on the descending ramp, to convey said items in layers to said second or third support planes;

third driving means situated along said second support plane and operated in step relation with said first driving means for pushing said items in layers on said second and/or third support planes in synchrony with another layer of items moving on said first support plane, as pushed by said first driving means, to move the two or three of the layers of items out of the station and form a stack of layers of items.

BRIEF DESCRIPTION OF THE DRAWINGS

The characteristic features of the invention will be pointed out in the following description of some preferred but not exclusive embodiments, with reference to the enclosed figures, in which.

DISCLOSURE OF THE PREFERRED EMBODIMENT

Figure 1:
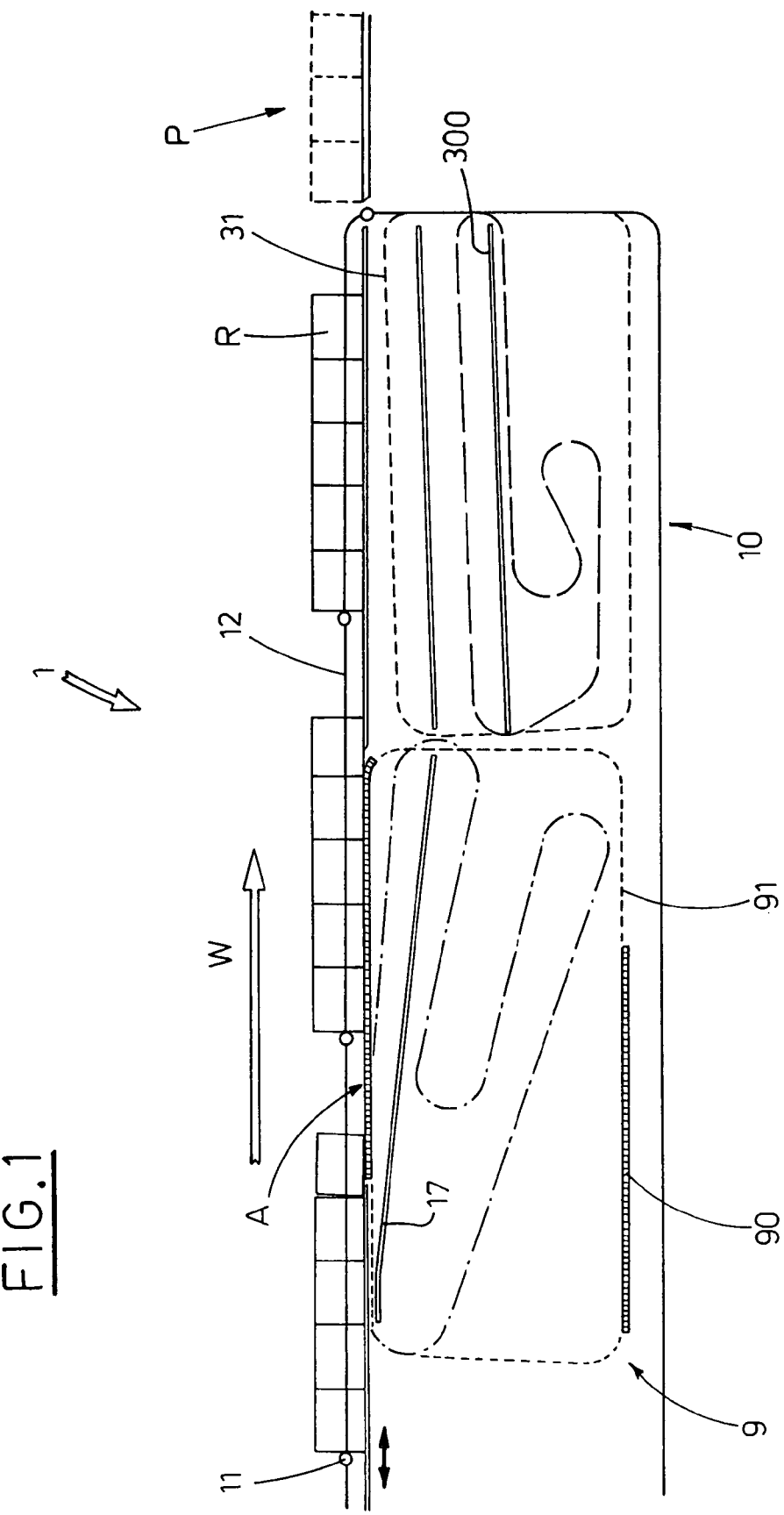
FIG. 1 is a schematic, side view of the proposed station during the step of forming a pile with only one layer of items.

Having regard to the enclosed Figures, the general reference numeral 1 indicates the proposed station for forming a pile P of items, e.g. rolls of paper R, arranged in layers S.

The station 1, proposed by the present invention, is fed by a grouping station (not shown), situated upstream, which releases intermittently, according to techniques known to those skilled in the field, the layers S formed by a prefixed number of rolls R, situated one beside another, in horizontal or vertical extension.

In a known way, a horizontal receiving surface 2 extends downstream from the grouping station, up to a packaging station (not shown).

First driving means 10, associated to the horizontal receiving surface 2, include e.g. a plurality of equidistant cross bars 11, carried by two endless chains 12, which extend along vertical planes situated on both sides of the receiving surface 2.

The receiving surface 2 has a gap, or window 4, whose dimensions allow a layer S of the maximum possible size to pass therethrough.

The receiving surface 2 includes therefore an initial section and a first support plane 3 situated downstream of the window 4.

Beneath the first support plane 3 there are situated a second and a third support planes (30, 300).

According to a preferred embodiment, the receiving surface 2 can slide with respect to the feeding direction W of the layers S, imposed by the first driving means 10, to allow a variation of the longitudinal extension of the window 4.

Below the window 4, there is a sloping platform or descending ramp 17 as called in the following. Possibly, the descending ramp can be replaced each time with one having dimensions in relation to the size of the rolls R, or even made in a way that it can be adjusted in its dimension in accordance with the size of the rolls.

According to a preferred embodiment, the first support surface 3 and the second an third support surfaces 30, 300 are set in vertical alignment with each other.

The descending ramp can swing about an end, namely the end situated upstream and arranged crosswise with respect to the motion of the layers of rolls. This end of the ramp is located close to the terminal edge of the initial section, where the window 4 begins.

Power means (not shown), associated to the descending ramp 17, change its inclination to allow the layers S conveyed on the ramp either to the second support surfaces 30 or to the third support plane 300, which is the lowermost.

The second support surface 30 is arranged vertically at distances from the corresponding first and second planes which are equal or slightly exceed the height of the layer S. This distances can be adjusted in relation to the size of the rolls and of the layers of rolls.

In the region of the window 4 there is also situated an upper run of an additional conveyor 9, formed by two endless chains 91, extending on both sides of the window 4.

The additional conveyor is not continuous, but has rather one or (preferably) more flexible plates 90 arranged along the chains. The plates are formed by flexible elements, e.g. rods or rolls arranged crosswise to the window and fastened at the relevant ends, to the chains. The longitudinal extension of the flexible plates corresponds to the maximum opening length of the window 4.

In the enclosed figures, the additional conveyor 9 has e.g. a pair of flexible plates 90.

It is to be pointed out that, in the region corresponding to the window 4, the flexible plate 90 is horizontal and is situated at the same level as the horizontal receiving surface 2: in this situation, the continuity of the latter is restored.

The flexible plates 90 move, as they are driven by the chains, and pass through a closing position A, in which they cover completely the window 4, which is otherwise open.

When one of the flexible plates takes the closing position A, the items in layers S moved by the first driving means 10, are supported in the region of the window, resting on the same flexible plate. Conversely, when the flexible plate takes another position, e.g. position B, out of the window the items in layers S are free to pass through the window 4 going to rest on the descending ramp 17, situated therebelow.

The speed of the additional conveyor 9, and consequently, of the flexible plate 90, is preferably equal to the speed of the cross bars 11, forming the first driving means 10, for reasons, which will be explained later.

Second driving means 20, fastened to the descending ramp 17, include e.g. a plurality of cross bars spaced out and carried by two endless chains, which extend along relevant vertical planes situated on both sides of the longitudinal sides of the ramp 17.

Preferably, the second driving means 20 are fastened to the ramp 17 and moved therealong.

The cross bars forming the second driving means 20 moves along the initial part of the window 4, sliding in horizontal direction for a short extension, them it turns downwards thus moving parallel to the ramp 17 up to its final part.

Third driving means 31, 301, associated to the corresponding second and third support planes 30, 300, include e.g. a plurality of cross bars spaced out and carried by two endless chains, which extend along relevant vertical planes situated on both sides of the same second and third support planes 30, 300.

The third driving means 31, 301 move the layers S along the second and third support planes 30, 300 in suitable step relation with the layers S moved on the first support plane 3 by the first driving means 10.

The operation of the proposed station is described in the following.

Each layer S of rolls R is released by the grouping station, situated upstream of the proposed station 1, and placed on the receiving surface 2. Then, the rear part of the layer is hit and then pushed by a cross bar 11 of the first driving means 10.

The rolls R of each layer S are compacted transversely on the receiving surface 2 in accordance to a known way.

In a first case, as shown in FIG. 1, single-layer packages are to be produced. One of the flexible plates 90 is moved to the closing position A and kept still there.

The layers of articles are moved one after another from the receiving surface 2 to the first support plane 3 by sliding on the flexible plane 90 which closes the window 4. In this situation, the second and third support planes 30, 300 are not used.

Each layer S is eventually transferred to a receiving plate leading to a further section of the machine, where the package is wrapped.

Figure 2:
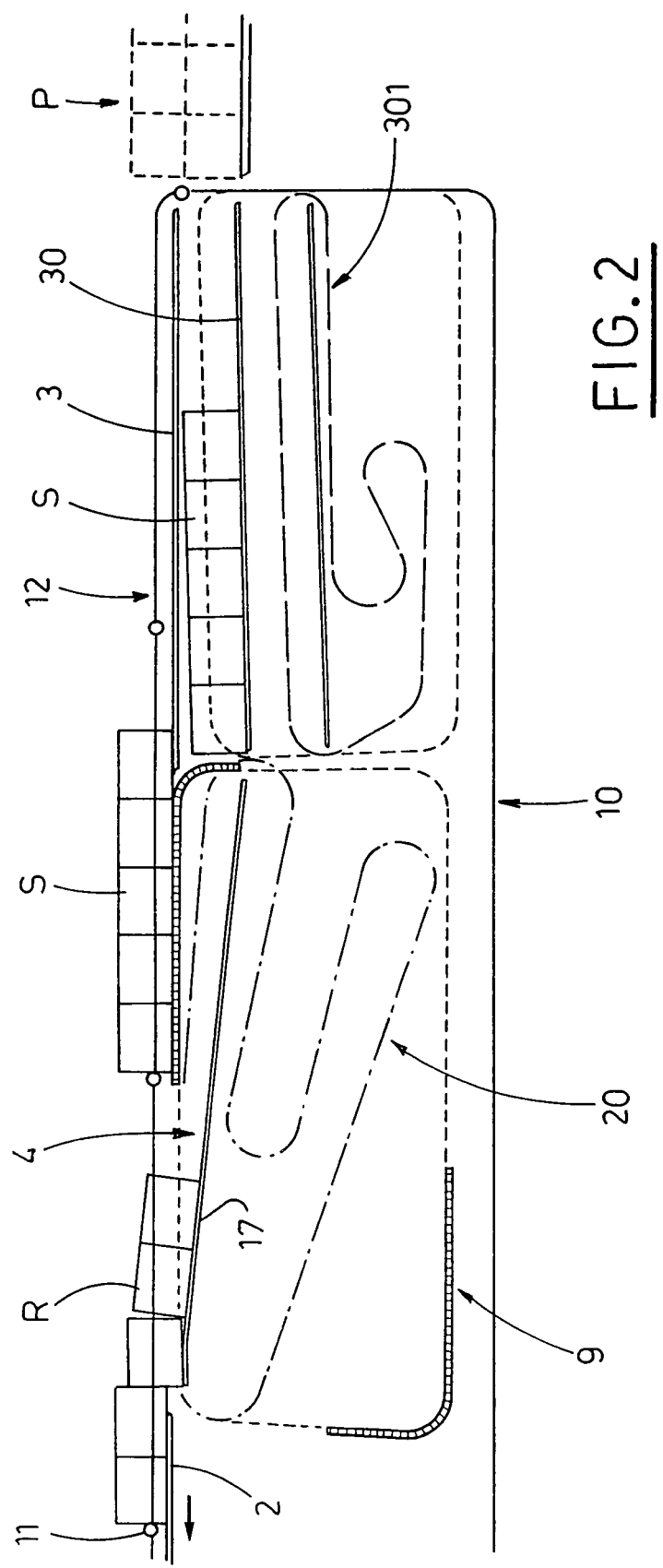
FIG. 2 is a schematic, side view of the same station during the step of forming a pile with two layers of items.

In a second situation, shown in FIG. 2, two-layer packages are to be produced. In this case, the flexible plates 90 are kept in motion and the speed of the flexible plate 90 is preferably equal to the feeding speed of the chains 12.

In this way, the layers S coming along the receiving surface 2, are transferred alternately one to the first support plane 1, resting on one of the flexible plates 90 crossing the window 4, and another to the second support plane 30, passing through the window 4 (see FIG. 2) and sliding along the ramp 17.

The motion speed of the layer S being delivered to the first support plane 3 is advantageously equal to the speed of the flexible plate 90, in order to avoid relative shifting between the flexible plate 90 and the layer S.

When the layer S of article, sent to the first support plane 3, has reached a position corresponding to a layer S previously positioned on the second support plane 30 therebelow, the third driving means 31, 301 are also operated and this last mentioned layer S is moved in synchrony with the uppermost layer S moving along the first support plane 3.

The two layers are moved together to the receiving plate where a stack P formed by two layers is obtained (see in dash-line in FIG. 2).

The length of the portion of the chains 91 between two consecutive flexible plates 90 is such that no flexible plate 90 covers the window 4, when it is reached by a layer S aimed at being placed on the descending ramp 17 (open condition B) and then onto the second support plane 30.

While the layer S is resting on the descending ramp 17, its sliding is determined by the action of a cross bar of the second driving means 20.

During this step, the receiving surface 2 can be slightly retracted, in the direction opposite to the feeding direction W of the layer S, so as to increase the longitudinal dimension of the window 4, and anticipate the fall of the layer S onto the ramp 17.

Figure 3:
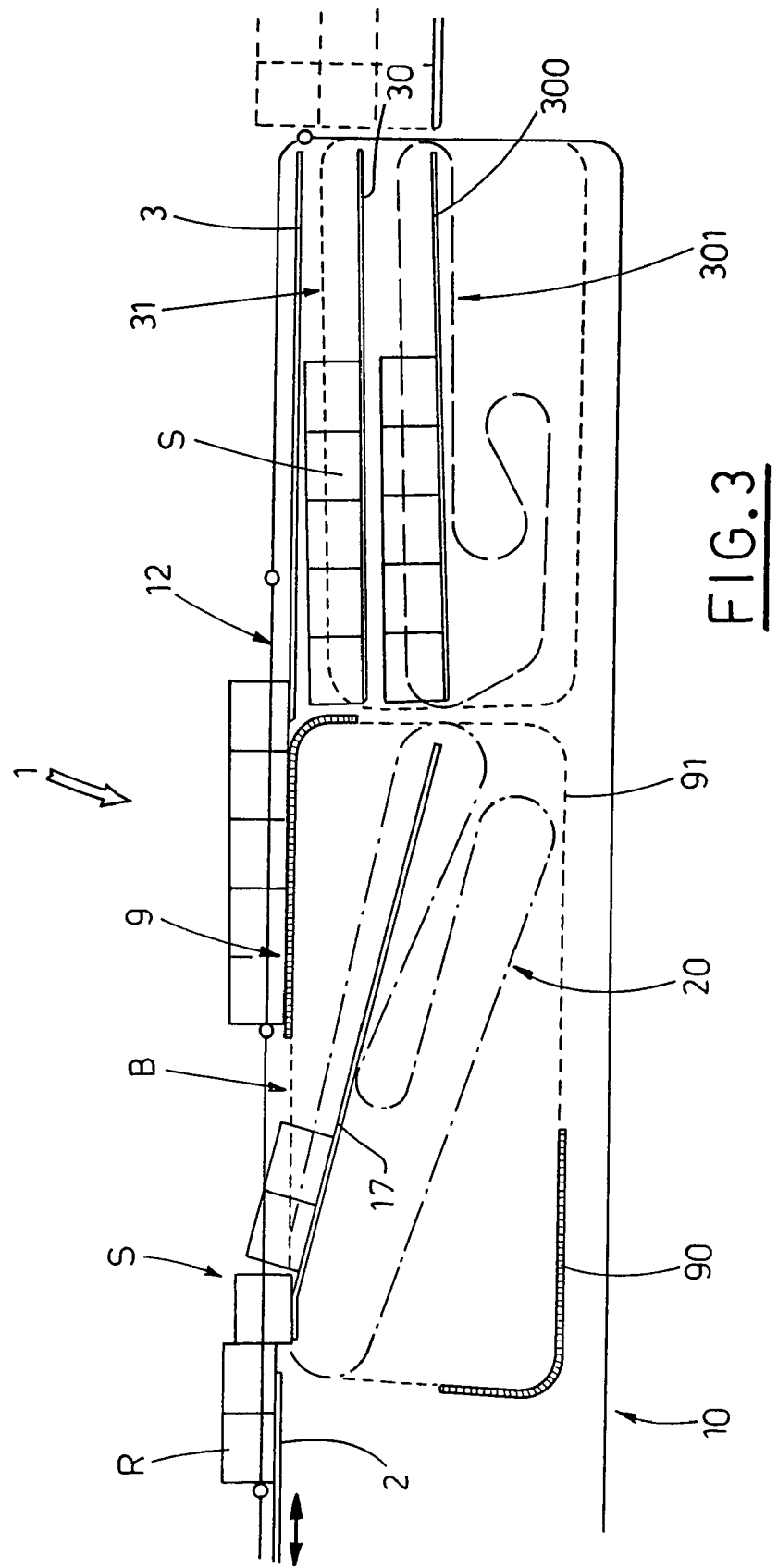
FIG. 3 is a schematic, side view of the same station, proposed by the present invention, during the step of forming a pile with three layers of items.

A third situation is shown in FIG. 3. In this situation a three-layer stack is to be produced. Starting from a normal operation condition, as the one shown in FIG. 3, two layers of rolls are waiting respectively on the second and third support planes 30, 300. The third driving means 31, 301 are deactivated.

While the layer S directed to the first support plane 3 is conveyed on the flexible plane 90 (see FIG. 3), the ramp 17 is lowered to match with the third support plane 300. The sudden lowering motion has no effect because no layer is sliding on the ramp.

The motion speed of the layer S being delivered to the first support plane 3 is advantageously equal to the speed of the flexible plate 90, in order to avoid relative shifting between the flexible plate 90 and the layer S.

When the layer S of article, sent to the first support plane 3, has reached a position corresponding to the layers S previously positioned on the second and third support planes 30, 300 therebelow, the third driving means 31, 301 are also operated and this last mentioned layers S are moved in synchrony with the uppermost layer S moving along the first support plane 3.

The three of the layers are moved together to the receiving plate where a stack P formed by three layers is obtained (see in dash-line in FIG. 3).

Then the chains 91 are stopped for a while (open condition B) to allow two consecutive layers go down through the window 4. The first one is sent to the third support plane 300 (FIG. 3) and the second is delivered to the second support plane 30, while or after the ramp is raised to match therewith. The raising motion does not make the rolls of the layer sliding on the ramp jump.

Alternatively, three flexible plates 90 can be fastened to the chains 91.

Other combination of the movements of the ramp are possible, in accordance with the motion of the flexible plates, to deliver the necessary number of layers and form the corresponding stack of layers.

The cross bar of the second driving means 20 transfers the layer S to the second or third support plane 30, 300, in relation to the inclination imposed by the power means of the ramp 17, that is in relation to the desired number of layers S, which is to form the stack P.

When placed on the second or third support planes, the layer S is subjected to the action of a cross bar connected to the corresponding third driving means 31, 301.

The cross bars, connected to the driving means, first 10 and third 31, 310 (when operated), move with the same speed, and push the respective layers S in synchrony.

The stack P is formed by overlaying two or three layers, in a region corresponding to the terminal sections of the corresponding support planes 3, 30, 300, i.e. on the receiving plate.

The second support plane 30 can extend beyond the final end of the first support plane 3 by a portion, which is longer than the longitudinal dimension of the layers S, so that the two layers S, operated with the same speed, are placed one on another without mutual shifting. This is of particular advantage when the two superposed layers are to be place over a third layer on the third support plane 300.

According to the described example, a flexible plate 90 is used for cyclical resuming the continuity of the first support surface; it is understood that it is possible to use otherwise equivalent means, fulfilling the same function, e.g. a moving belt, operated endlessly along a horizontal path, with one side parallel to the longitudinal extension of the window 4.

The described embodiment allows piles P to be formed with three layers, but it is understood that piles P of different number of layers S can as well be obtained.

The stacks P of more layers S can be formed in the same way.

In the station 1, proposed by the invention, the receiving surface 2 is connected to the first support plane 3 and the second and third support planes 30, 300 by a moving belt 90, which cyclically acts as a bridge with the first support plane 3 or leave the way free to the descending ramp 17, which has advantageously a variable orientation.

This allows to simplify the structure of the station for forming piles of layers, thus increasing the production rate.

The proposed station allows to obtain piles P formed by a number of layers much bigger than 2, differently from the prior art devices and apparatuses. For instance, a five-layer package can be formed by forming a three-layer one first and then a two-layer one, which are then superposed on one another. In this case, the chains 91 with the flexible plates 90 are stopped alternately, i.e. only when the three-layer stack is to be formed.

What is claimed is:

1. A station for forming a pile of items arranged in layers, the station comprising:
   - a receiving surface for receiving items arranged in layers and coming from a feeding station situated upstream;
   - a first support plane, coplanar with and situated after said receiving surface, from which said first support plane is spaced apart for delimiting a window having a dimension sufficient for said items arranged in layers to pass freely through said window;
   - first driving means for conveying the items in layers along the receiving surface and the first support plane in a feeding direction;
   - a second support plane, placed below said first support plane and being parallel therewith;
   - a third support plane, placed below said second support plane and being parallel with said first support plane and second support plane;
   - a descending ramp situated below said window, said descending ramp having a first end joined with said receiving surface and a second end movable only between a first position in which the second end is joined with the second support plane and a second position in which the second end is joined with said third support plane;
   - an additional conveyor locatable in a position corresponding to and below said window for selectively either conveying said items in layers from the receiving surface to the first support surface, due to the action of said first driving means, or being movable to allow said items in layers, coming from the receiving surface to pass through the window and be received by the descending ramp;
   - second driving means situated along said descending ramp and operated in step relation with said additional conveyor for pushing said items in layers passed through said window, the items in layers sliding on the descending ramp, to convey said items in layers to said second or third support planes;
   - third driving mean situated along said second support plane and operated in step relation with said first driving means for pushing said items in layers on said second or third support planes in synchrony with another layer of items moving on said first support plane, as pushed by said first driving means, to move the two or three of the layers of items out of the station in unison and thereby form a stack of two or three layers of items.

2. A station, as claimed in claim 1, wherein said second driving means, acting along said descending ramp, are fastened to the descending ramp.

3. A station, as claimed in claim 1, wherein said receiving surface slides along said feeding direction, in step relation with at least said additional conveyor, for varying the longitudinal extension of said window.

4. A station, as claimed in claim 1, wherein said additional conveyor includes at least one flexible plate driven to pass through a closing position for completely covering the window, when one of the layers of items has to be transferred, resting on the same flexible plate, from said receiving surface to said first support plane, or for leaving the window free when one of the layers of items has to be conveyed to said descending ramp.

5. A station, as claimed in claim 4, wherein said additional conveyor includes two endless chains, situated at both sides of said window, with a plurality of consecutive thin slats or rods fastened to said chains to define one or more flexible plates having longitudinal extension substantially corresponding to the longitudinal extension of the window.

6. A station, as claimed in claim 1, wherein said first, second and third driving means include a plurality of cross bars, substantially equidistant and having ends fastened to two endless chains extending in vertical planes situated at both sides of the receiving surface and first support surface, descending ramp, and second support surfaces respectively.

7. A station, as claimed in claim 1, wherein said first support surface and said second support surfaces are aligned with respect to a vertical plane.

8. A station, as claimed in claim 1, wherein the first driving means are moved with the same speed as the third driving means.

9. A station, as claimed in claim 1, wherein said third driving means move a layer of items released by the descending ramp with speed determined in relation to the speed of a corresponding layer of article disposed above and moved on said first support surface.

* * * * *